United States Patent
Sedillo

(10) Patent No.: US 9,085,713 B2
(45) Date of Patent: Jul. 21, 2015

(54) STABLE AQUEOUS WAX DISPERSIONS

(75) Inventor: Lawrence Sedillo, Filderstadt-Bernhausen (DE)

(73) Assignee: STAHL INTERNATIONAL BV, Waalwijk (NL)

( * ) Notice: Subject to any disclaimer, the term of this patent is extended or adjusted under 35 U.S.C. 154(b) by 179 days.

(21) Appl. No.: 13/817,380

(22) PCT Filed: Jun. 29, 2011

(86) PCT No.: PCT/EP2011/003205
§ 371 (c)(1),
(2), (4) Date: Feb. 15, 2013

(87) PCT Pub. No.: WO2012/022389
PCT Pub. Date: Feb. 23, 2012

(65) Prior Publication Data
US 2013/0136935 A1    May 30, 2013

(30) Foreign Application Priority Data

Aug. 17, 2010  (EP) .................................. 10008584
Oct. 14, 2010  (EP) .................................. 10013666

(51) Int. Cl.
| | |
|---|---|
| B32B 27/20 | (2006.01) |
| B32B 27/30 | (2006.01) |
| B32B 27/40 | (2006.01) |
| B32B 27/12 | (2006.01) |
| B32B 29/06 | (2006.01) |
| C14C 9/00 | (2006.01) |
| C14C 11/00 | (2006.01) |
| C09G 1/10 | (2006.01) |
| C09D 191/06 | (2006.01) |
| C08J 3/03 | (2006.01) |
| C08L 91/06 | (2006.01) |
| C08K 3/34 | (2006.01) |

(52) U.S. Cl.
CPC ................. C09D 191/06 (2013.01); C08J 3/03 (2013.01); C08L 91/06 (2013.01); *C08J 2391/06* (2013.01); *C08K 3/346* (2013.01)

(58) Field of Classification Search
CPC ...... C09D 191/06; C09D 7/1283; C09G 1/04; C09J 3/03; C08J 3/03; C08J 2391/06; C08L 33/08; C08L 91/06; C08K 3/346; B32B 27/12; B32B 27/20; B32B 27/30; B32B 27/40; B32B 29/06
USPC .......... 428/423.3, 485, 511; 524/199; 106/10, 106/14.35, 31.13, 271; 252/8.57, 8.91
See application file for complete search history.

(56) References Cited

U.S. PATENT DOCUMENTS

| | | |
|---|---|---|
| 3,635,870 A | 1/1972 | Thoma et al. |
| 3,640,937 A | 2/1972 | Thoma et al. |
| 3,989,870 A | 11/1976 | Bocks et al. |
| 4,237,264 A | 12/1980 | Noll et al. |
| 4,897,291 A * | 1/1990 | Kim .............................. 427/393 |
| 5,743,949 A | 4/1998 | Kainz |
| 5,746,812 A | 5/1998 | Muller et al. |
| 6,162,850 A | 12/2000 | Boucher |
| 7,300,979 B2 | 11/2007 | Wenning et al. |
| 2003/0154885 A1 | 8/2003 | Krendlinger et al. |
| 2005/0136236 A1 | 6/2005 | Hassan et al. |
| 2006/0089276 A1* | 4/2006 | Klotz ............................ 508/464 |
| 2006/0116524 A1* | 6/2006 | Bruening et al. ............. 554/166 |
| 2009/0088519 A1 | 4/2009 | O'Brien Stickney et al. |

FOREIGN PATENT DOCUMENTS

| | | |
|---|---|---|
| DE | 2646440 | 4/1978 |
| WO | 2012/022389 | 2/2012 |

OTHER PUBLICATIONS

Bieleman, "Additives for Coatings", Wiley-VCH ISBN 3-527-29785-5, 2000, 32-33.
Braun, et al., "Rheology Modifiers Handbook: Practical Use and Application", William Andrew Publishing, Norwich, NY, USA, 2000, 74-89.
Braun, et al., "Rheology Modifiers Handbook: Practical Use and Application", William Andrew Publishing, Norwich, NY, USA, 2000, 94-99.
Lau, et al., "Rheology of Hydrophobic-Alkali-Soluble-Emulsions (HASE) and the Effects of Surfactants", Korea-Australia Rheology Journal vol. 14, No. 1, 2002, 1-9.
Reeve, "Acrylic Rheology Modifiers and Surfacants: Developments to Overcome Some of the Deficiencies of Current Thickeners", CID, Jun. 2003, Milan, 2003, 1-10.
Smith, et al., "Polyurethane Asociative Thickeners for Waterborne Coatings", Coatings Technology Handbook, Third Edition, 2005, 85-1-85-8.

* cited by examiner

*Primary Examiner* — Thao T Tran
(74) *Attorney, Agent, or Firm* — Peacock Myers, P.C.; Jeffrey D. Myers

(57) ABSTRACT

This invention relates to a stable aqueous wax dispersion comprising

A) from 5 to 65% by weight of micronized wax, the wax comprising an amide wax, polyethylene wax, modified polyethylene wax, polyethylene/amide wax, polyethylene/polytetrafluroethylene (PTFE) wax, polypropylene wax, modified polypropylene wax, polyethylene/polypropylene wax, polytetrafluroethylene (PTFE) wax or copolymers thereof or any mixture thereof having a mean particle size of from 1 to 100 μm and an acid number of less then 10 mg of KOH/g of wax and B) 0.5 to 20% by weight of a thickening/dispersing agent, comprising of a alkali swellable acrylic polymers (ASE) or a hydrophobically modified alkali swellable emulsion (HASE) or a hydrophobically modified ethoxylated urethane (HEUR) or a polymer containing both a high molecular weight acrylic copolymer moiety and a hydrophobically modified ethoxylated urethane as a thickening/dispersing agent or mixtures thereof C) 0 to 5% by weight of a water soluble base as a neutralizing agent D) 0 to 5% by weight of a surface active/dispersant agent E) 0 to 40% by weight of a polymeric binder or polymeric binders F) 0 to 5% by weight smectic clay thickening agent(s).

17 Claims, No Drawings

STABLE AQUEOUS WAX DISPERSIONS

The present invention relates to novel aqueous polyolefin wax dispersions which comprise from 5 to 65% by weight of micronized wax having a mean particle size of from 1 to 100 µm with an acid number between 0 and 10 mg/KOH per gram of wax, and alkali swellable acrylic acid emulsion (ASE), hydrophobically modified alkali swellable emulsion (HASE), hydrophobically modified ethoxylated urethane (HEUR) and or polymer containing both a high molecular weight acrylic copolymer moiety and a hydrophobically modified ethoxylated urethane moiety.

As thickening agents/dispersants, and optionally one or more components selected from water soluble alkali as neutralizing agent, a polymeric binder, a surface active/dispersant agent, and a smectic clay thickening agent.

DESCRIPTION OF RELATED ART

Aqueous wax dispersions based on polyethylene or polypropylene can be prepared in principle by two methods:

As primary dispersions by polymerization of ethylene or propylene in a surfactant-containing aqueous phase under superatmospheric pressure and in the presence of an initiator system, or as secondary dispersions by dispersing dispersible polyethylene or polypropylene waxes in powder form with the aid of a suitable dispersant system. Emulsifiable waxes are usually understood here as meaning low molecular weight polyolefin chains functionalized with carboxylate, keto or hydroxyl groups. Said chains can be prepared either by copolymerization of ethylene or propylene with, for example, unsaturated carboxylic acids, such as acrylic acid, or by atmospheric oxidation of polyolefin waxes.

Primary dispersions generally have particle sizes of from 0.01 to 0.25 µm, whereas it has been possible to date to prepare stable secondary dispersions having a mean particle size of only up to about 1 µm. Dispersions having larger particles tend to undergo phase separation owing to the low density and the hydrophobic nature of the polyolefin wax.

In both preparation methods, only solids contents of up to about 35% by weight can usually be achieved. Higher wax contents are achievable in relatively high amounts only with difficulties and in the presence of suitable assistants.

Primary dispersions have been made by using dispersing agents from 0.5 to 20% by weight of glyceride which may additionally contain hydroxyl groups, said glyceride having been reacted with 1 to 50 moles of 1,2-alkylene oxide of 2 to 4 carbons as a dispersant.

U.S. Pat. No. 5,746,812 discloses stable aqueous polyolefin wax dispersions which comprise a glyceride of predominantly $C_{16}$-$C_{22}$-monocarboxylic acids or $C_{16}$-$C_{22}$-monocarboxylic acids containing hydroxyl groups, said glyceride having been reacted with 1 to 50 moles of 1,2-alkylene oxide of 2 to 4 carbon atoms as a dispersant and a polyethylene wax or polypropylene wax having a mean particle size of from 1 to 50 µm and an acid number of less then 5 mg of KOH/g of wax.

In other preparations primary dispersions have been made by using dispersing agents 0.01 to 7% by weight of polymeric carbohydrate derivatives, the polymeric carbohydrate derivatives comprising a cellulose ether or starch or bean flour derivative or mixture thereof.

U.S. Pat. No. 5,743,949 discloses stable aqueous wax dispersions, which comprise polymeric carbohydrate derivatives comprising a cellulose ether, starch ether, bean flour or mixtures thereof and a micronized wax, the wax comprising an amide or montan or polyethylene wax or mixture thereof wherein the wax has an average particle size of 1 to 50 µm.

SUMMARY OF THE INVENTION

It is the object of the present invention to provide a stable aqueous micronized wax dispersion, the wax preferably comprising an amide or polyethylene or polypropylene or PTFE (polytetrafluoroethylene) wax or copolymers thereof or mixtures thereof ("wax") which, owing to the performance characteristics required, have a mean particle size of more then 1 µm and less then 100 µm and storage stable. Furthermore, it should be possible to prepare these dispersions in a very simple manner.

By the choice of dispersing agent B, it is now possible to obtain stable aqueous wax dispersions with the desired properties by simply stirring the corresponding micronized wax in water together with the dispersing agent at room temperature. Wax contents of up to 65% by weight can be achieved by this process. The waxes are micronized by customary processes. The general average particle size is in the range from 1 to 100 µm, preferably 2 to 80 µm. In the case of polypropylene and or polyethylene waxes, the range from 5 to 80 µm is particularly preferred, in the case of montan waxes, the range from 1 to 15 µm, is particularly preferred.

OBJECT/FIELD OF THE INVENTION AND PREFERRED EMBODIMENTS

Object of the invention is an aqueous micronized wax dispersion, comprising
A) from 5 to 65% by weight of micronized wax having a mean particle size of from 1 to 100 µm with an acid number between 0 and 10 mg/KOH per gram of wax, and
B) 0.1 to 20% by weight of at least one thickening agent and dispersant, selected from the group consisting of alkali swellable polymer or hydrophobically modified alkali swellable emulsion, hydrophobically modified ethoxylated urethane, and a polymer containing both a high molecular weight acrylic copolymer moiety and a hydrophobically modified ethoxylated urethane moiety.

In a preferred embodiment of the invention, the aqueous micronized wax dispersions additionally comprise
C) 0.01 to 5% by weight of a water soluble alkali compound as neutralizing agent.

In this embodiment a neutralizing agent is not needed if the hydrophobically modified ethoxylated urethane (HEUR), or the polymer containing both a high molecular weight acrylic copolymer moiety and a hydrophobically modified ethoxylated urethane moiety is used, as it works by association, not by alkali swelling.

In another preferred embodiment of the invention, the aqueous micronized wax dispersions additionally comprise
D) 0.1 to 40% of a polymeric binder.

In another preferred embodiment of the invention, the aqueous micronized wax dispersions additionally comprise
E) 0.1 to 5% by weight of a surface active/dispersant agent.

In another preferred embodiment of the invention, the aqueous micronized wax dispersions additionally comprise
F) 0.1 to 5% by weight of a smectic clay thickening agent.

Any balance up to 100% by weight may be made up by water.

By using the inventive thickener B, it is now possible to obtain stable micronized wax dispersions having the desired properties by simply stirring the appropriate micronized wax powder together with the dispersant/thickener at room temperature into water, and, if desired, conventional assistants C), D), E), F) and mixtures of two or more of these. Solids contents of up to 65% by weight can be realized.

The inventive aqueous micronized wax dispersion comprises preferably at least one thickener B selected from the group consisting of alkali swellable acrylic acid emulsion (ASE), hydrophobically modified alkali swellable emulsion (HASE), hydrophobically modified ethoxylated urethane (HEUR), and a polymer containing both a high molecular weight acrylic copolymer moiety and a hydrophobically modified ethoxylated urethane moiety.

The term alkali swellable acrylic emulsion (ASE) refers to an acrylic emulsion copolymer that is straight chain or crosslinked and contains acid groups. The ASE does not comprise hydrophobic modification. The ASE is preferably selected from homopolymers of (meth) acrylic acid, and copolymers of (meth)acrylic acid, (meth)acrylate esters and maleic acid. When the pendant carboxylic groups are neutralized with an alkaline agent, the polymer is said to swell or its backbone expands, producing considerable viscosity increase and rheology modificiation which thickens the liquid phase in which the ASE is present effectively at pH values of 6 and greater because the ASE are typically water insoluble at pH values of less than 6 and water soluble at pH values of greater than 6. Alkali soluble or alkali swellable emulsion thickeners that contain no hydrophobic groups and thicken by a non-associative mechanism upon neutralization with base are described in the art as ASE thickeners. As a general rule, the higher molecular weight ASEs will give greater efficiencies, as is disclosed in Acrylic Rheology Modifiers and Surfactants: Developments to overcome some deficiencies of current thickeners, Paul Reeve, CID, June 2003, Milan, and Rheology Modifiers Handbook, Practical use and Application, David B. Braun, Meyer R. Rosen, William Andrews Publishing, pp. 74 to 89.

The ASE are preferably made up chemically of one to two blocks as represented in figure below

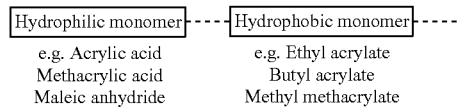

e.g. Acrylic acid     e.g. Ethyl acrylate
Methacrylic acid     Butyl acrylate
Maleic anhydride     Methyl methacrylate Suitable hydrophilic monomers for the ASE are acrylic acid, methacrylic acid and maleic acid. Suitable hydrophobic monomers for the ASE are the esters of acrylic or methacrylic acid with $C_1$- to $C_4$-alcohols, in particular ethyl acrylate, butyl acrylate and methyl methacrylate.

An example for an ASE structure is shown in Formula (1)

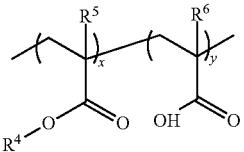

(1)

wherein
$R^4$ is $C_1$ to $C_4$ alkyl
$R^5$, $R^6$ are independently hydrogen or methyl
x and y are stoichiometric indices that allow that the respective monomer units are present in an amount of 10 to 90 weight-% each, and that the molecular weight of the ASE structure is between 1,000 and 2,000,000 g/mol.

In a preferred embodiment, $R^4$ is ethyl or butyl and $R^5$ is hydrogen. In another preferred embodiment $R^4$ is methyl and $R^5$ is methyl. In another preferred embodiment $R^6$ is methyl.

The term hydrophobically modified alkali swellable acrylic emulsion (HASE) refers to an acrylic emulsion copolymer which is straight chain or crosslinked and contains acid groups and hydrophobic pendent groups. The HASE thickens primarily by pendant carboxylic acid group neutralization with an alkaline agent and at least partially by an associative mechanism, as is described in the art for HASE thickeners. The stiffness caused by steric hindrance of the polymer backbone and the hydrophobicity of the of the pendant groups are responsible for the rheological changes in the liquid phase containing HASE. As a general rule an increase in the hydrophobe chain length, or the number of hydrophobes per unit of polymer will give greater viscosifying efficiencies. This is e.g. described in Rheology Modifiers Handbook, Practical use and Application, David B. Braun, Meyer R. Rosen, William Andrews Publishing, pp. 94 to 99; Rheology of hydrophobic alkali-soluble-emulsions (HASE) and the effects of Surfactants, A. K. M. Lau, C. Tiu, T. Kealy and K. C. Tam, Korea-Australia Rheology Journal, Vol. 14, No. 1, March 2002, pp. 1-9; Additives for Coatings, edited by John Beilman, Wiley-VCH Publishing, pp. 32-33.

The HASE are preferably made up chemically of three blocks as represented in figure below

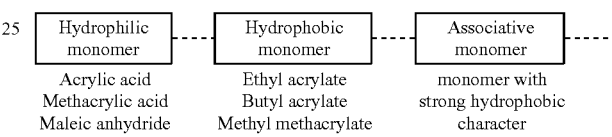

Acrylic acid     Ethyl acrylate     monomer with
Methacrylic acid     Butyl acrylate     strong hydrophobic
Maleic anhydride     Methyl methacrylate     character The hydrophilic and hydrophobic monomers suitable for the HASE are the same as described with respect to the ASE. The associative monomer of the HASE is a monomer that shows a strong hydrophobic character. A preferred monomer is ester of acrylic acid or methacrylic acid with $C_8$-$C_{22}$ alcohols, particularly $C_{12}$-$C_{20}$ alcohols. Another preferred monomer is shown in Formula (2) as "Macromonomer".

An example for a HASE structure is shown in Formula (2)

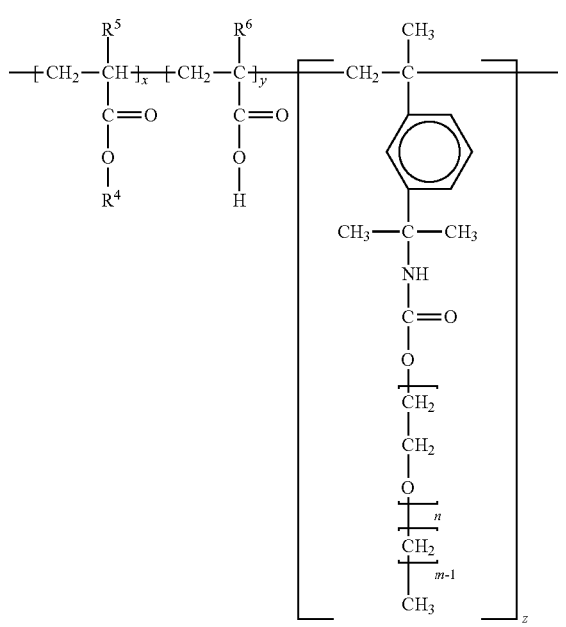

(2)

Macromonomer

In Formula (2),
$R^4$ is $C_1$ to $C_4$ alkyl
$R^5$, $R^6$ are independently hydrogen or methyl
n is a number from 1 to 20
m is a number from 2 to 5
x, y, z are stoichiometric indices that allow that the HASE of Formula (2) comprises 10 to 89 weight-% of the "x" monomer, 10 to 89 wt.-% of the "y" monomer and 0.01 to 1 wt.-% of the Macromonomer, and that the HASE structure of Formula (2) has a molecular weight of 1,000 to 2,000,000 g/mol.

Another example for a HASE structure is shown in Formula (3)

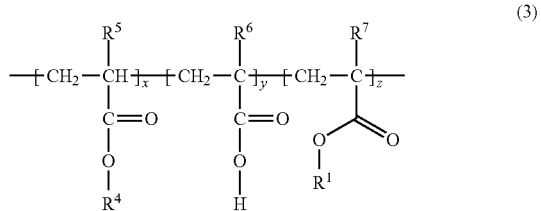

wherein $R^4$, $R^5$, $R^6$, x, y, z have the meaning as given for Formula (2), and
$R^1$ is $C_8$ to $C_{22}$, preferably $C_{12}$ to $C_{20}$ alkyl or alkenyl
$R^7$ is hydrogen or methyl.

The term hydrophobically modified ethylene oxide urethanes (HEUR) refers to a nonionic hydrophilic polymer preferably formed by reaction of diisocyanates with diols and hydrophobic capping or blocking groups. The HEUR are purely associative thickeners. They develop intra- or intermolecular links as their hydrophobic groups associate with other hydrophobic ingredients in the formulation. As a general rule the strength of the association depends on the number, size, and frequency of the hydrophobic capping or blocking units. The HEUR develops micelles as would a normal surfactant. The micelles then link between the other ingredients by associating with their surfaces. This builds a three dimensional network.

An example for a HEUR chemical structure is $$R^2(OCH_2CH_2)_n—O—CO—NH—R^1—NH—CO—O—(CH_2CH_2O)_nR^2$$

wherein
$R^1$ is an aliphatic hydrocarbon group having 4 to 10 carbon atoms
$R^2$ is a $C_8$ to $C_{20}$ aliphatic group that may be substituted with a hydroxyl group, an amine group or both.

General teaching on HEUR is available in Coatings Technology Handbook, Third edition, Polyurethane Associative Thickeners for Waterborne Coatings, pp. 85.1-85.8. Figure 85.2 from this reference shows a diagrammatic representation of a HEUR thickener.

The mean particle size of the micronized waxes A in the novel dispersions is from 1 to 100 µm, in particular from 2 to 80 µm, especially from 5 to 80 µm. The waxes are micronized by the customary process, the average particle size being in the range from 1 to 80 µm. The mean (average) particle size can be tested by "dynamic laser light scattering" using a Malvern Mastersizer 2000, as described in Malvern procedures and definition to ISO 13320-1 guidelines. In the case of the amide waxes, the range from 1 to 15 µm and in the case of the polyolefin waxes, modified polyolefin waxes and PTFE waxes the range from 5 to 80 µm is particularly preferred.

The wax used is, for example, an amide wax, a synthetic product of stearic/palmitic acid and ethylene diamine, the acid component being present as a mixture of 50-60% by weight of a $C_{18}$ carbon chain and 50-40% by weight of a $C_{16}$ carbon chain. This wax has an acid number of 0 to 10, preferably 0 to 8 mg of KOH/g of wax and an alkali number of 0 to 3.5, preferably 0 to 2 mg of HCl, calculated as mg of KOH/g of wax.

Suitable commercial non-functionalized polyethylene waxes and functionalized polyethylene waxes have weight average molecular weights from 500 to 10,000 and non-functionalized polypropylene waxes and functionalized polypropylene waxes, have average molecular weights from 5,000 to 50,000 g/mol. These waxes are finely comminuted by conventional methods so that they have the required particle size. The non-functionalized polyolefins have acid numbers of preferably less then 5, especially less then 1 and the functionalized polyolefins have acid numbers preferably less then 19, especially less then 10.

The aqueous wax dispersions comprise preferably 5 to 65 wt.-% of the micronized wax A.

The aqueous wax dispersions comprise preferably 0.1 to 20% by weight of at least one alkali swellable acrylic acid emulsion (ASE), hydrophobically modified alkali swellable emulsion (HASE), hydrophobically modified ethoxylated urethane (HEUR), or a polymer containing both a high molecular weight acrylic copolymer moiety and a hydrophobically modified ethoxylated urethane moiety as thickening agent and dispersant B.

The aqueous wax dispersions comprise preferably 0.1 to 5% by weight of a water soluble alkali compound as neutralizing agent C, when neutralization is needed.

The aqueous wax dispersions comprise preferably 0.1 to 40% of a polymeric binder D.

The aqueous wax dispersions comprise preferably 0.1 to 5% by weight of a surface active/dispersant agent as surface active/dispersant agent E.

The aqueous wax dispersions comprise preferably 0.1 to 5% by weight of a smetic clay thickening agent as smetic thickening agent F.

To the inventive aqueous wax dispersions, antifoams, for example silicone derivatives, solubilizers, flow improvers, in particular at solids contents above 50% by weight, biocides or mixtures thereof, may also be added.

The dispersions are pourable and stirrable even at high solids contents and have viscosities of from 800 to 3,000 and from 3,000 to 15,000 mPas, preferably determined by using a Brookfield DV-II+ Pro viscometer at room temperature (22° C.) using RV spindles RV1 to RV7 at 20 rpm and determining the proper spindle to produce a digital display reading between 10% and 90% torque. These viscosity ranges are preferred when the inventive aqueous wax dispersions are used as an additive in leather treatment, giving better print retention on the leather and better high temperature release properties compared to standard foam and top-coat finishing systems.

The dispersions are pourable and stirrable even at high solids contents and have viscosities of from 15,000 to 150,000 mPas, preferably determined by using a Brookfield DV-II+ Pro viscometer at room temperature (22° C.) using RV spindles RV1 to RV7 at 20 rpm and determining the proper spindle to produce a digital display reading between 10% and 90% torque. These viscosity ranges are preferred when the inventive aqueous wax dispersions are used as an additive or, as is in leather treatment to fill surface defects, compared to standard hollow microsphere systems, or inorganic filler systems or foam systems, having no potential for microsphere or foam disruption over time and being lower in density, for lighter weight leather, compared to inorganic filler systems.

The waxes that can be readily used are, for example, an amide wax, a synthetic product of stearic/palmitic acid and ethylene diamine, the acid component being present as a mixture of 50-60% by weight of a $C_{18}$ carbon chain and 50-40% by weight of a $C_{16}$ carbon chain. This wax has an acid number of 0 to 10, preferably 0 to 8 mg of KOH/g of wax and an alkali number of 0 to 3.5, preferably 0.01 to 2 mg of HCl, calculated as mg of KOH/g of wax.

Waxes that can also be readily used are, for example, non functionalized polyethylene waxes having an acid number of 0 to 5, preferably 0.01 to 1 mg of KOH/g of wax and functionalized polyethylene waxes having an acid number of 0 to 19, preferably 0.01 to 10 mg of KOH/g of wax. The weight average molecular weights are in the preferred range from 500 to 10,000 g/mol, in particular 1,000 to 5,000 g/mol or non-functionalized polypropylene waxes having an acid number of 0 to 5, preferably 0.01 to 1 mg of KOH/g of wax and functionalized polypropylene waxes having an acid number of 0 to 19, preferably 0.01 to 10 mg of KOH/g of wax. The weight average molecular weights are preferably in the range from 5,000 to 50,000 g/mol, in particular 15,000 to 30,000 g/mol or mixtures thereof are used. The content of polyolefin in these waxes is advantageously more then 99% by weight.

The thickening/dispersing agent B is selected from the group consisting of an alkali swellable acrylic acid emulsion (ASE), hydrophobically modified alkali swellable emulsion (HASE), a hydrophobically modified ethoxylated urethane (HEUR), and a polymer containing both a high molecular weight acrylic copolymer moiety and a hydrophobically modified ethoxylated urethane moiety.

When an alkali swellable acrylic thickener (ASE) or a hydrophobically modified alkali swellable emulsion (HASE) thickener is used, preferably, a water soluble inorganic base or organic amine including ammonia is used to neutralize for proper activation. Agent C. ASE and HASE type thickeners begin thickening above a pH of 6.5 but best results demand a pH of between 8 and 10 to assure proper activation and reproducibility.

The polymeric binder, agent (D), can be a single component or a multi-component mixture.

Suitable polymeric binders (D) include, for example, polybutadienes, polyacrylates, polyurethanes, polyvinyl acetates, and vinyl chloride/vinyl acetate copolymers.

For the purposes of this invention, polybutadienes (D) include polymers of optionally substituted butadienes with 4 to 9 carbon atoms per molecule, such as 1,3-butadiene, isoprene, 2,3-dimethyl-1,3-butadiene, 2-neopentyl-1,3-butadiene, chloroprene, 2-cyano-1,3-butadiene, and mixtures thereof (1,3-butadiene being particularly preferred).

Particularly preferred polybutadienes (D) are polymers prepared using
(1) 1 to 10 parts by weight of one or more α,β-monoethylenically unsaturated aliphatic carboxylic acids with 2 to 12 carbon atoms and
(2) 90 to 99 parts by weight of a mixture of
  (a) 10 to 90 parts by weight (preferably 30 to 70 parts by weight) of optionally substituted butadiene and
  (b) 10 to 90 parts by weight (preferably 30 to 70 parts by weight) of one or more vinyl aromatics with 8 to 12 carbon atoms and/or (meth)acrylonitrile, wherein the quantity of (meth)acrylonitrile in the mixture is no more than 50 parts by weight.

Examples of α,β-monoethylenically unsaturated mono- and dicarboxylic acids (1) include acrylic acid, methacrylic acid, itaconic acid, fumaric acid, and maleic acid together with monoesters of these dicarboxylic acids having 1 to 8 carbon atoms in the alcohol component, such as monoalkyl itaconate, fumarate, and maleate.

Suitable vinyl aromatics (2) (b) are those in which the vinyl group is directly attached to the ring consisting of 6 to 10 carbon atoms. Examples of vinyl aromatics include styrene and substituted styrenes such as 4-methylstyrene, 3-methylstyrene, 2,4-dimethylstyrene, 4-isopropylstyrene, 4-chlorostyrene, 2,4-dichlorostyrene, divinylbenzene, α-methylstyrene and vinylnaphthalene. Styrene is preferred.

Up to 25 parts by weight of the monomers (2) may be replaced by one or more copolymerizable monomers, particularly by (meth)acrylic acid alkyl esters, such as methyl, ethyl, propyl, isopropyl, butyl, isobutyl, and 2-ethylhexyl (meth)acrylate; mono- and diesters prepared from alkanediols and α,β-monoethylenically unsaturated monocarboxylic acids, such as ethylene glycol mono(meth)acrylate, propylene glycol mono(meth)acrylate, ethylene glycol di(meth)acrylate, and 1,4-butanediol di(meth)acrylate; amides of α,β-monoethylenically unsaturated mono- and dicarboxylic acids, such as acrylamide and methacrylamide and the N-methylol compounds thereof, together with N-alkoxymethyl(meth)acrylamides and N-acyl(meth)acrylamides having 1 to 4 carbon atoms in the alkyl groups such as N-methoxymethyl(meth)acrylamide, N-butoxymethyl(meth)acrylamide and N-acetoxymethyl(meth)acrylamide. Monomers bearing sulfonic acid groups are also suitable, such as styrenesulfonic acid, (meth)allylsulfonic acid, or the water-soluble salts thereof. Further comonomers which may be considered are vinyl esters of carboxylic acids having 1 to 18 carbon atoms, particularly vinyl acetate and vinyl propionate, vinyl chloride, and vinylidene chloride; vinyl ethers such as vinyl methyl ether; vinyl ketones such as vinyl ethyl ketone; and heterocyclic monovinyl compounds such as vinyl pyridine.

For the purposes of the invention, polyacrylates (D) include polymers based on monomers consisting entirely or partially of acrylic acid and/or methacrylic acid $C_1$-$C_{12}$ alkyl esters. Preferred polyacrylates (D) have number average molecular weights of about 500 to about 2,000 (preferably 500 to 1,600) and Shore A hardnesses of 11 to 99 (preferably 20 to 80, more preferably 20 to 60).

Preferred polyacrylates (D) are polymers prepared from
(a) acrylic acid $C_1$-$C_{12}$ alkyl esters and/or methacrylic acid $C_1$-$C_{12}$ alkyl esters such as methyl acrylate, ethyl acrylate and methacrylate, butyl acrylate and methacrylate, and 2-ethylhexyl acrylate and methacrylate,
(b) optionally, α,β-monoethylenically unsaturated mono- and/or dicarboxylic acids such as acrylic acid, methacrylic acid, and maleic acid semi-esters with up to 8 carbon atoms in the alcohol component,
(c) optionally, acrylonitrile,
(d) optionally, methyl methacrylate, styrene, chlorine-substituted, or $C_1$-$C_4$ alkyl-substituted styrene such as α,β-methylstyrene, o-chlorostyrene, p-chlorostyrene, o-, m- or p-methylstyrene, p-tert-butylstyrene, and
(e) optionally, other monomers, such as, for example, vinyl acetate, acrylamide, methacrylamide, hydroxy-$C_2$-$C_4$ alkyl acrylate and methacrylate, such as 2-hydroxyethyl acrylate and methacrylate, 2-hydroxypropyl acrylate and methacrylate, 2-hydroxybutyl acrylate and methacrylate.

Preferred quantities for the individual groups of monomers for such polyacrylates are 10 to 100 wt. % of (a), optionally 0.5 to 20 wt. % of (b), optionally 1 to 30 wt. % of (c), 0 to 60 wt. % of (d), and 0 to 50 wt. ° A) of (e), wherein the percentages each relate to the total of the monomers polymerized in the polyacrylate (D).

These and similar polyacrylates are, for example, described in DE-A-24 60 329 and DE-A-36 10 576.

For the purposes of the invention, the term "polyurethanes" also includes polyurethaneureas and polyureas.

Polyurethanes (D) may be prepared in a known manner in a melt or, preferably, in an organic solvent.

Polyisocyanates of the formula $Q(NCO)_2$ are used for synthesis of the polyurethanes (D), wherein Q denotes an aliphatic hydrocarbon residue with 4 to 12 carbon atoms, a cycloaliphatic hydrocarbon residue with 6 to 25 carbon atoms, an aromatic hydrocarbon residue with 6 to 15 carbon atoms, or an araliphatic hydrocarbon residue with 7 to 15 carbon atoms. Examples of preferred diisocyanates include tetramethylene diisocyanate, hexamethylene diisocyanate, dodecamethylene diisocyanate, 1,4-diisocyanatocyclohexane, 3-isocyanatomethyl-3,3,5-trimethylcyclohexyl isocyanate (i.e., isophorone diisocyanate), 4,4'-diisocyanatodicyclohexylmethane, 4,4'-diisocyanato-3,3'-dimethyldicyclohexylmethane, 4,4'-diisocyanato-2,2-dicyclohexylpropane, 1,4-diisocyanatobenzene, 1,4- or 2,6-diisocyanatotoluene or mixtures of these isomers, 4,4'-, 2,4'- or 2,2'-diisocyanatodiphenylmethane or mixtures of the isomers, 4,4'-diisocyanato-2,2-diphenylpropane, p-xylylene diisocyanate, and $\alpha,\alpha,\alpha',\alpha'$-tetramethyl-m- or -p-xylylene diisocyanate, together with mixtures containing these compounds.

It is, of course, also possible to use the more highly functional polyisocyanates known in polyurethane chemistry or known modified polyisocyanates, for example, polyisocyanates having carbodiimide groups, allophanate groups, isocyanurate groups, urethane groups, and/or biuret groups.

Isocyanate-reactive compounds for reaction with the polyisocyanates are in general polyhydroxyl compounds which have 2 to 8 (preferably 2 or 3) hydroxyl groups per molecule and an (average) molecular weight of up to about 5,000 (preferably of up to 2,500). Both low molecular weight polyhydroxyl compounds having molecular weights of 32 to 349 and higher molecular weight polyhydroxyl compounds having average molecular weights of at least 350 (preferably at least 1,000) may be considered for this purpose.

Higher molecular weight polyhydroxyl compounds include the hydroxypolyesters, hydroxypolyethers, hydroxypolythioethers, hydroxypolyacetals, hydroxypolycarbonates, and/or hydroxypolyesteramides that are known in polyurethane chemistry, preferably such compounds having average molecular weights of 600 to 4,000, more preferably those with average molecular weights of 800 to 2,500. Polycarbonate polyols, polyether polyols, and polyester polyols are particularly preferred.

Components suitable for the introduction of polyethylene oxide units in the synthesis of the polyurethanes (D) include homopolyethylene glycols and ethylene oxide mixed polyethers with hydroxyl terminal groups (preferably ethylene oxide/propylene oxide mixed ethers) having a block or random distribution, preferably polyether carbonates and polyether esters based on the above-stated homopolyethylene glycols, ethylene oxide mixed polyethers or mixtures thereof with other polyhydroxyl compounds that form polycarbonates or polyesters.

The optimum quantity of the polyethylene oxide units in the polyurethane (D) is somewhat dependent upon the sequence length and obeys the general rule that the quantity may be somewhat greater for shorter sequence lengths and somewhat less for longer sequence lengths. For example, while at a sequence length of 2 the content of these polyethylene oxide units in the polyurethane (D) may be, for example, up to 50 wt.-%, for a sequence length of over 20, it is generally recommended to restrict the content of polyethylene oxide units in the polyurethane (D) to 20 wt.-%.

In order to promote the dispersing action, monofunctional polyethylene oxide alcohols (i.e., ethoxylated monohydric alcohols or ethoxylated phenols) may be incorporated into the polyurethane (D) in quantities of 0.2 to 5 wt.-%, relative to polyurethane (D). The proportion of such monofunctional polyethylene oxide units in polyurethane (D) should not exceed 30 wt.-% (preferably 20, more preferably 10 wt.-%) relative to the quantity of the total incorporated polyethylene oxide units. However, the best results are obtained if no monofunctional polyethylene oxide units are incorporated.

Thus, the starting components for the polyurethanes (D) that yield the polyethylene oxide units primarily comprise ethylene oxide polyethers and ethylene oxide/propylene oxide mixed polyethers having 2 or 3 hydroxyl groups with a predominant proportion by weight of ethylene oxide units. Pure ethylene oxide polyethers are preferred.

For the purposes of the invention, the term "average molecular weights" means molecular weights determined as a number average.

The compounds used in addition to the compounds yielding polyethylene oxide units may be selected from those compounds customary in polyurethane chemistry that are capable of reacting with isocyanate groups.

Polyhydroxyl components are described below that are suitable as polyurethane synthesis components but which contain no polyethylene oxide units.

Suitable polycarbonates containing hydroxyl groups can be obtained by the reaction of carbonic acid derivatives, for example, diphenyl carbonate or phosgene, with diols. Suitable diols include, for example, -ethylene glycol, 1,2- and 1,3-propanediol, 1,4- and 1,3-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, and tetrabromo-bisphenol A. The diol component preferably contains from 40 to 100 wt.-% hexanediol (preferably 1,6-hexanediol) and/or hexanediol derivatives, preferably those having ether or ester groups in addition to terminal OH groups, for example, products obtained by reacting 1 mol of hexanediol with at least 1 mol (preferably 1 to 2 mol) of caprolactone according to DE-17 70 245, or by etherification of hexanediol with itself to yield di- or trihexylene glycol. The preparation of such derivatives is known, for example from DE-15 70 540. The polyether/polycarbonate diols described in DE-37 17 060 may also very readily be used.

The hydroxypolycarbonates should be substantially linear but, if desired, may readily be branched by the incorporation of polyfunctional components, in particular low molecular weight polyols. Glycerol, trimethylolpropane, 1,2,6-hexanetriol, 1,2,4-butanetriol, trimethylolpropane, pentaerythritol, quinitol, mannitol and sorbitol, methyl glycoside, 1,4,3,6-dianhydrohexitols, for example, are suitable for this purpose.

Suitable polyether polyols are those polyethers known in polyurethane chemistry, such as the addition or mixed addition compounds of tetrahydrofuran, styrene oxide, propylene oxide, butylene oxides, or epichlorohydrin (particularly of propylene oxide) produced using divalent starter molecules such as water, the above-stated diols, or amines with two NH bonds.

Suitable polyester polyols include reaction products of polyhydric, preferably dihydric and optionally additionally trihydric, alcohols with polybasic, preferably dibasic carboxylic acids. Instead of the free polycarboxylic acids, it is also possible to use the corresponding polycarboxylic acid anhydrides or corresponding polycarboxylic acid esters of lower alcohols or mixtures thereof to produce the polyester. The polycarboxylic acids can be aliphatic, cycloaliphatic, aromatic, and/or heterocyclic and can optionally be substituted (for example, with halogen atoms) and/or unsaturated.

Examples of suitable polycarboxylic acids and derivatives thereof include succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric and trimeric fatty acids such as oleic acid (optionally mixed with monomeric fatty acids), dimethyl terephthalate, and terephthalic acid bis-glycol ester.

Suitable polyhydric alcohols include ethylene glycol, 1,2- and 1,3-propanediol, 1,4- and 2,3-butanediol, 1,6-hexanediol, 1,8-octanediol, neopentyl glycol, cyclohexanedimethanol (i.e., 1,4-bis-hydroxymethylcyclohexane), 2-methyl-1,3-propanediol, glycerol, trimethylolpropane, 1,2,6-hexanetriol, 1,2,4-butanetriol, trimethylol-ethane, pentaerythritol, quinitol, mannitol and sorbitol, methyl glycoside, diethylene glycol, triethylene glycol, tetraethylene glycol, dipropylene glycol, dibutylene glycol, and polybutylene glycols.

Mixtures of the above-mentioned polyether polyols with polycarbonate polyols and/or polyester polyols having average molecular weights of 1,000 to 3,000 prepared from adipic acid, 1,6-hexanediol, and neopentyl glycol are also particularly preferred.

Chain extenders having molecular weights of 32 to 299 and having 1 to 4 hydroxyl and/or amino groups are also particularly suitable as further components for the synthesis of the polyurethanes (D).

Low molecular weight polyhydroxyl compounds ("chain extenders") include the most varied types of diols, such as the following:
(a) alkane diols, such as ethylene glycol, 1,2- and 1,3-propanediol, 1,4-butanediol, 1,5-pentanediol, dimethyl-1,3-propanediol, and 1,6-hexanediol;
b) ether diols, such as diethylene glycol, triethylene glycol, or hydroquinone dihydroxyethyl ether;
c) ester diols of the general formulae

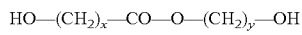
HO—(CH$_2$)$_x$—CO—O—(CH$_2$)$_y$—OH and

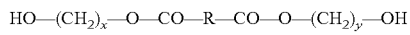
HO—(CH$_2$)$_x$—O—CO—R—CO—O—(CH$_2$)$_y$—OH in which
R represents an alkylene or arylene residue with 1 to 10 (preferably 2 to 6) carbon atoms,
x is 2 to 6, and
y is 3 to 5, such as δ-hydroxybutyl-ε-hydroxycaproic acid ester, ω-hydroxyhexyl-γ-hydroxybutyric acid ester, adipic acid (β-hydroxyethyl) ester and terephthalic acid bis(β-hydroxyethyl) ester.

Polyamines may, however, also be used as chain extenders. Polyamine chain extenders are preferably aliphatic or cycloaliphatic diamines, although trifunctional or more highly functional polyamines may optionally also be used to achieve a certain degree of branching. Examples of suitable aliphatic polyamines include ethylenediamine, 1,2- and 1,3-propylenediamine, 1,4-tetramethylenediamine, 1,6-hexamethylenediamine, an isomer mixture of 2,2,4- and 2,4,4-trimethylhexamethylenediamine, 2-methylpentamethylenediamine and bis-(β-aminoethyl) amine (i.e., diethylenetriamine).

Examples of suitable cycloaliphatic polyamines include

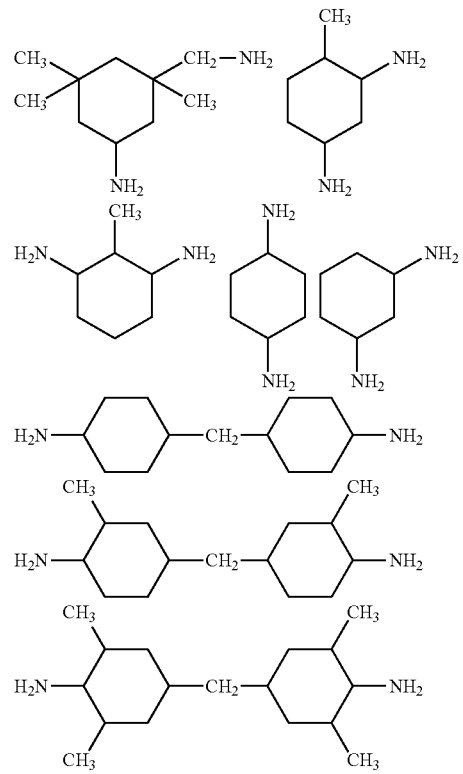

Araliphatic polyamines, such as 1,3- and 1,4-xylylenediamine or α,α,α',α'-tetramethyl-1,3- and -1,4-xylylenediamine, may also be used as chain extenders for preparation of the polyurethanes (D).

For the purposes of the invention, hydrazine, hydrazine hydrate, and substituted hydrazines should also be considered as diamines. Examples of suitable substituted hydrazines include methylhydrazine, N,N'-dimethylhydrazine and the homologs thereof, together with acid dihydrazides, such as carbodihydrazide, oxalic acid dihydrazide, the dihydrazides of malonic acid, succinic acid, glutaric acid, adipic acid, β-methyladipic acid, sebacic acid, hydracrylic acid, and terephthalic acid, semicarbazido alkylene hydrazides, such as for example G-semicarbazidopropionic acid hydrazide (DE-17 70 591), semicarbazidoalkylene carbazine esters, such as 2-semicarbazidoethyl carbazine ester (DE-19 18 504) or aminosemicarbazide compounds, such as β-aminoethyl semicarbazido carbonate (DE-19 02 931).

Ionic groups for the polyurethanes (D) include alkali and ammonium carboxylate and sulfonate groups, together with ammonium groups. Suitable components for introducing such groups into the polyurethanes (D) consequently include dihydroxycarboxylic acids, diaminocarboxylic acids, dihydroxysulfonic acids together with diaminoalkylsulfonic acids and the salts thereof, such as dimethyiolpropionic acid, ethylenediamine-β-ethylsulfonic acid, ethylenediaminepropyl- or -butylsulfonic acid, 1,2- or 1,3-propylene-diamine-β-ethylsulfonic acid, lysine, 3,5-diaminobenzoic acid, and the alkali and/or ammonium salts thereof, as well as the addition product of sodium bisulfite and 2-butene-1,4-diol.

Aliphatic diols containing sulfonate groups according to DE-24 46 440 of the following formula are particularly preferred components for introducing the ionic groups into the polyurethanes (D):

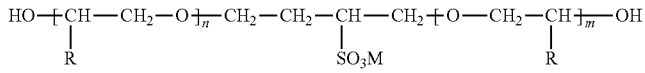

in which
R represents hydrogen or an organic residue with 1 to 8 carbon atoms,
M represents ammonium or an alkali metal cation, and m and n are numbers from 1 to 10.

Examples of (potentially) cationic synthesis components are diols containing tertiary amino groups, such as N-methyldiethanolamine or the protonation or alkylation products thereof.

In very general terms, cationic and/or anionic hydrophilic difunctional synthesis components of the type described for the preparation of aqueous polyurethane dispersions may be used as components to introduce the ionic groups into the polyurethanes (D). Examples of such compounds include dihydroxyl compounds, dihydroxyldiamines, or dihydroxyldiisocyanates containing (potentially) ionic groups.

Suitable polyurethanes (D) are described, for example, in DE-22 31 411 and DE-26 51 506.

According to a preferred embodiment, suitable polyurethanes (D) are those containing both incorporated polyethoxy groups and ionic groups, particularly polyurethanes (D) containing terminal polyalkylene oxide chains with an ethoxy group content of 0.5 to 10 wt.-%, relative to the polyurethane (D), and 0.1 to 15 milliequivalents of ammonium, sulfonium, carboxylate, and/or sulfonate groups per 100 g of polyurethane (D).

Polyacrylates and polyurethanes, together with blends thereof, are particularly preferred as the binder (D).

Agent E, a surface active/dispersant agent, is either a non-surface active polymer or a surface-active substance added to a suspension, usually a colloid, to improve the separation of particles and to prevent settling or clumping. Dispersants consist normally of one or more surfactants. By way of example, ionic, non-ionic, amphiphilic and polymeric compounds having different chemical structures may be used as dispersants. Specific examples of suitable dispersant classes, classified by the hydrophilic group, may be selected from the group consisting of
 Anionic
 Carboxylic
 Sulfuric esters
 Alkane sulfonic acids
 Alkyl aromatic sulfonic acids
 Phosphate esters
 Cationic
 Amine salts (primary, secondary, and tertiary)
 Quaternary salts
 Nonionic
 Ethers
 Esters
 Amides
 Amphoteric Agent F, a smectic clay, are used as a secondary thickener, having shear thinning flow, require no neutralization and work solely through an associative mechanism. Examples include montmorillonite, bentonite, attapulgite and laponite.

The stable aqueous wax dispersions according to the invention are particularly suitable for the preparation of care compositions for automobiles, shoe polishes, floors and stone, drawing compounds, aqueous wood varnishes, printing inks and paints, print pastes and in finishes, in plastics processing, for the treatment of fabrics, yarns and non-wovens, in papermaking and in corrosion protection, for simulated leather, semi-synthetic leather and leather treatment and as release agents.

EXAMPLES

The following examples serve to illustrate the invention and are not to be understood as limiting. The viscosities of the wax dispersions were determined by Brookfield rotary viscometer DV-II+ Pro at room temperature (22° C.) using RV spindles RV1 to RV7 at 20 rpm and determining the proper spindle to produce a digital display reading between 10% and 90% torque. All of the percentage data are to be understood as % by weight.

Example 1

ASE Thickener 138 grams of demineralised water was initially introduced into the mixing vessel. 3 grams of ASE thickening/dispersing agent (Appretan® 1301, manufacturer Clariant) was added along with 1 gram of neutralizing agent (25% aqueous ammonia) with stirring until uniform. 40 grams of micronized polypropylene wax (Ceridust® 6050 M, manufacturer Clariant), was intensively stirred into the thickened solution at room temperature. The dispersion obtained has a viscosity of 4,650 mPas, is homogeneous, pourable and storage stable.

Example 2

HASE Thickener 140 grams of demineralized water was initially introduced into the mixing vessel. 0.5 grams of HASE thickening/dispersing agent (ACULYNR22, manufacturer DOW) was added along with 1 gram of neutralizing agent (25% aqueous ammonia) with stirring until uniform. 60 grams of micronized polypropylene wax (Ceridust® 6050 M, manufacturer Clariant), was intensively stirred into the thickened solution at room temperature. The dispersion obtained has a viscosity of 5,450 mPas, is homogeneous, pourable and storage stable.

Example 3

ACRYLIC COPOLYMER/HEUR Combination Thickener 140 grams of demineralized water was initially introduced into the mixing vessel. 0.5 grams of ACRYLIC COPOLYMER/HEUR combination thickening/dispersing agent (Tafigel® AP 30, manufacturer Munzing) was added with stirring until uniform. 60 grams of micronized polypropylene wax (Ceridust® 6050 M, manufacturer Clariant), was intensively stirred into the thickened solution at room temperature. The dispersion obtained has a viscosity of 5,450 mPas, is homogeneous, pourable and storage stable

Example 4

HEUR Thickener 140 grams of demineralized water was initially introduced into the mixing vessel. 4.4 grams of HEUR thickening/dispersing agent (Acrysol® RM-8, manufacturer Dow) was added with stirring until uniform. 60 grams of micronized polypropylene wax (Ceridust® 6050 M, manufacturer Clariant), was intensively stirred into the thickened solution at room temperature. The dispersion obtained has a viscosity of 10,000 mPas, is homogeneous, pourable and storage stable.

Example 5

Complex Mixture 75.09 grams of demineralized water was initially introduced into the mixing vessel. 21.7 grams of polypropylene wax (Ceridust® 6050 M, manufacturer Clariant), 0.18 grams of surface active agent (Surfynol® 2502, manufacturer Air Products), 0.64 grams of defoaming agent (Melio® Defoamer B, manufacturer Clariant), were intensively stirred in at room temperature. 2.02 grams of thickening/dispersing agent (Mirox® AM, manufacturer Bozzetto) was added along with 0.37 grams of neutralizing agent (25% aqueous ammonia) with intensive stirring. The dispersion obtained has a viscosity of 2,970 mPas, is homogeneous, pourable and storage stable.

Example 6

Complex Mixture with Laponite 63.38 grams of demineralized water and 6.34 grams of 1% strength laponite were mixed together then 4.75 grams of Binder (Binder L, manufacturer Clariant). 20.92 grams of micronized polypropylene wax (Ceridust® 6050 M, manufacturer Clariant), 0.16 grams of wetting agent (Surfynol® 2502, manufacturer Air Products), 0.64 grams of defoaming agent (Melio® Defoamer B, manufacturer Clariant), were intensively stirred in at room temperature. 3.17 grams of thickening/dispersing agent (Mirox® AM, manufacturer Bozzetto) was added along with 0.64 grams of neutralizing agent (25% aqueous ammonia) with intensive stirring. The dispersion obtained has a viscosity of 3,300 mPas, is homogeneous, pourable and storage stable.

Example 7

Complex Mixture 13.61 grams of demineralized water and 69.78 grams Binder (Melio® 11-R-93, manufacturer Clariant 12.45 grams of micronized polypropylene wax (Ceridust® 6050 M, manufacturer Clariant), 0.20 grams of defoaming agent (Melio® Defoamer B, manufacturer Clariant), were intensively stirred in at room temperature. 3.17 grams of thickening/dispersing agent (Mirox® AM, manufacturer Bozzetto) was added along with 0.64 grams of neutralizing agent (25% aqueous ammonia) with intensive stirring. The dispersion obtained has a viscosity of 2,600 mPas, is homogeneous, pourable and storage stable.

The invention claimed is:

1. An aqueous micronized wax dispersion, comprising:
   A) from 5 to 65% by weight of micronized wax having a mean particle size of from 1 to 100 μm with an acid number between 0 and 10 mg/KOH per gram of wax, and
   B) 0.1 to 20% by weight of a polymer containing both a high molecular weight acrylic copolymer moiety and a hydrophobically modified ethoxylated urethane moiety.

2. The aqueous micronized wax dispersion of claim 1, further comprising:
   C) 0.01 to 5% by weight of a water soluble alkali compound as a neutralizing agent.

3. The aqueous micronized wax dispersion of claim 1, further comprising:
   D) 0.1 to 40% by weight of a polymeric binder.

4. The aqueous micronized wax dispersion as claimed in claim 1, further comprising:
   E) 0.1 to 5% by weight of a surface active/dispersant agent.

5. The aqueous micronized wax dispersion as claimed in claim 1, further comprising:
   F) 0.1 to 5% by weight of a smectic clay thickening agent.

6. The aqueous micronized wax dispersion as claimed in claim 5, wherein component F is a smectic clay thickening agent selected from the group consisting of montmorillonite, bentonite, attapulgite and laponite.

7. The aqueous micronized wax dispersion as claimed in claim 1, wherein component A is a wax selected from the group consisting of an amide wax, polyethylene wax, modified polyethylene wax, polyethylene/amide wax, polyethylene/polytetrafluoroethylene (PTFE) wax, polypropylene wax, modified polypropylene wax, polyethylene/polypropylene wax, polytetrafluoroethylene (PTFE) wax or copolymers thereof and mixtures thereof, wherein the wax has a mean particle size of from 2 to 80 μm, and an acid number of less than 10 mg of KOH/g of wax.

8. The aqueous micronized wax dispersion as claimed in claim 1, wherein component B is an alkali swellable acrylic acid emulsion (ASE) or a hydrophobically modified alkali swellable emulsion (HASE).

9. The aqueous micronized wax dispersion as claimed in claim 1, wherein component B is a hydrophobically modified ethoxylated urethane emulsion (HEUR).

10. The aqueous micronized wax dispersion as claimed in claim 1, wherein component B is selected from the group consisting of an alkali swellable acrylic acid emulsion (ASE) and hydrophobically modified alkali swellable emulsion (HASE) and wherein the pH of the aqueous micronized wax dispersion is 6.5 or greater.

11. The aqueous micronized wax dispersion as claimed in claim 1, wherein the aqueous micronized wax dispersion has a viscosity of from 800 to 15,000 mPas determined by using a Brookfield DV-II+ Pro viscometer, at room temperature (22° C.) using RV spindles RV1 to RV7 at 20 rpm and determining the proper spindle to produce a digital display reading between 10% and 90% torque.

12. The aqueous micronized wax dispersion as claimed in claim 1, wherein the aqueous micronized wax dispersion has a viscosity of at least 3,000 mPas.

13. The aqueous micronized wax dispersion as claimed in claim 1, wherein the aqueous micronized wax dispersion has a viscosity of from 15,000 to 150,000, determined by using a Brookfield DV-II+ Pro viscometer, at room temperature (22° C.) using RV spindles RV1 to RV7 at 20 rpm and determining the proper spindle to produce a digital display reading between 10% and 90% torque.

14. A method of making a stable aqueous micronized wax dispersion as claimed in claim 1, comprising the steps of:
   a) mixing component B with water to form a mixture,
   b) optionally neutralizing the mixture with component C,
   c) adding the micronized wax component A as a solid wax powder to the mixture,
   d) optionally adding a surface active agent/dispersant component D to the mixture,
   e) optionally adding a polymeric binder as component E to the mixture,
   f) optionally adding a smectic clay thickening agent component F to the mixture, and
   g) intensively stirring the mixture until it is homogeneous, wherein the steps may be carried out in any order.

15. A care composition for automobiles, shoe polishes, floors and stone, drawing compounds, aqueous wood varnishes, printing inks, printing paints, print pastes, finishes, plastics, fabrics, yarns, nonwovens, paper, corrosion protection compounds, simulated leather, semi-synthetic leather, or treated leather produced with an aqueous micronized wax dispersion as claimed in claim 1.

16. Simulated leather, semi-synthetic leather or treated leather produced with an aqueous micronized wax dispersion as claimed in claim 1.

17. A composition for leather treatment produced with an aqueous micronized wax dispersion as claimed in claim 1.

\* \* \* \* \*